United States Patent
Jiang

(10) Patent No.: US 6,687,248 B2
(45) Date of Patent: Feb. 3, 2004

(54) SEQUENCE NUMBER ORDERING IN A WIRELESS COMMUNICATIONS SYSTEM

(75) Inventor: Sam Shiaw-Shiang Jiang, Hsin-Chu (TW)

(73) Assignees: ASUSTek Computer Inc., Taipei (TW); ASUS Computer International, Newark, CA (US)

(*) Notice: Subject to any disclaimer, the term of this patent is extended or adjusted under 35 U.S.C. 154(b) by 493 days.

(21) Appl. No.: 09/756,737

(22) Filed: Jan. 10, 2001

(65) Prior Publication Data

US 2002/0089984 A1 Jul. 11, 2002

(51) Int. Cl.$^7$ ............................................... H04L 12/56
(52) U.S. Cl. ........................ 370/394; 370/328; 370/469
(58) Field of Search ............................. 455/825.08, 63; 370/328, 329, 394, 469

(56) References Cited

U.S. PATENT DOCUMENTS 6,456,826 B1 * 9/2002 Toskala et al. ............... 455/63

OTHER PUBLICATIONS

3GPP TS 25:322 v3.4.0 (Sep. 2000).

* cited by examiner

*Primary Examiner*—John Pezzlo
(74) *Attorney, Agent, or Firm*—Winston Hsu

(57) ABSTRACT

Within a move receiving window (MRW) super-field there is an initial sequence number that is arranged within the MRW super-field according to a set algorithm. The MRW super-field is transmitted to a receiver, and the receiver extracts the initial sequence number. The receiver then assumes that all other layer 2 PDU sequence numbers within the MRW super-field are sequentially after the initial sequence number to effect discarding of layer 2 SDUs. The initial sequence number is assumed to be either sequentially on or after a starting point sequence number, or sequentially before an end point sequence number of a receiving window of the receiver, depending on whether a special case value exists for the length field of the MRW super-field. The special case value indicates that a single SDU that extends beyond a transmitting window of the transmitter is to be discarded.

20 Claims, 18 Drawing Sheets

SEQUENCE NUMBER ORDERING IN A WIRELESS COMMUNICATIONS SYSTEM

BACKGROUND OF THE INVENTION

1. Field of the Invention

The present invention relates to a wireless communications system. More specifically, the present invention discloses a method and system that can properly determine sequence number ordering when performing an SDU discard procedure with a move receiving window (MRW) operation.

2. Description of the Prior Art

The surge in public demand for wireless communication devices has placed pressure upon industry to develop increasingly sophisticated communications standards. An example of such a standard is the 3$^{rd}$ Generation Partnership Project (3GPP™), Technical Specification Group Radio Access Network, RLC Protocol Specification. Such standards utilize a three layer approach to communications. Please refer to FIG. 1. FIG. 1 is a block diagram of the three layers in a communications protocol. In a typical wireless environment, a base station 10 is in wireless communications with one or more mobile units 20. An application 13 on the base station 10 composes a message 11 and has it delivered to the mobile unit 20 by handing the message 11 to a layer 3 interface 12. The layer 3 interface 12 delivers the message 11 to a layer 2 interface 16 in the form of layer 2 service data units (SDUs) 14. The layer 2 SDUs 14 may be of any length. The layer 2 interface 16 composes the layer 2 SDUs 14 into one or more layer 2 protocol data units (PDUs) 18. Each layer 2 PDU 18 is of a fixed length, and is delivered to a layer 1 interface 19. The layer 1 interface 19 is the physical layer, transmitting data to the mobile unit 20. The transmitted data is received by the mobile unit 20 by the layer 1 interface 29 and reconstructed into one or more layer 2 PDUs 28, which are passed up to the layer 2 interface 26. The layer 2 interface 26 receives the layer 2 PDUs 28 and builds up a layer 2 SDU 24. The layer 2 SDU 24 is passed up to the layer 3 interface 22. The layer 3 interface 22 in turn converts the layer 2 SDUs 24 (which may also be termed layer 3 PDUs) back into a message 21, which should be identical to the original message 11 that was generated by the base station 10 application 13. The message 21 is then passed to an application 23 on the mobile unit 20.

Of particular interest is the layer 2 interface, which acts as a buffer between the relatively high-end data transmission and reception requests of the applications, and the low-level requirements of the physical transmission and reception process. Please refer to FIG. 2. FIG. 2 is a diagram of a transmission/reception process from a layer 2 perspective. The layer 2 interface 32 of a transmitter 30, which may be either a base station or a mobile unit, receives a string of layer 2 SDUs 34 from layer 3. The layer 2 SDUs 34 are sequentially ordered from 1 to 5, and are of an unequal length. The layer 2 interface 32 converts the string of layer 2 SDUs 34 into a string of layer 2 PDUs 36. The layer 2 PDUs are sequentially ordered from 1 to 4, and are all of an equal length. The string of layer 2 PDUs is then sent off to the layer 1 interface for transmission. A reverse process occurs at the receiver end 40, with the receiver layer 2 interface 42 converting a received string of layer 2 PDUs 46 into a received string of layer 2 SDUs 44. Under certain transport modes, however, the multi-layered protocol insists that the receiver layer 2 interface 42 present the layer 2 SDUs to layer 3 in order. That is, the layer 2 interface 42 must present the SDUs 44 to layer 3 in the sequential order of the SDUs 44, beginning with SDU 1 and ending with SDU 5. The ordering of the SDUs 44 may not be scrambled, nor may a subsequent SDU be delivered to layer 3 until all of the prior SDUs have been delivered.

In line transmissions, such a requirement is relatively easy to fulfill. In the noisy environment of wireless transmissions, however, the receiver 40, be it a base station or a mobile unit, often misses data. Some layer 2 PDUs in the received string of PDUs 46 will therefore be missing. Thus, ensuring that the layer 2 SDUs 44 are presented in order can pose a significant challenge. Please refer to FIG. 3. FIG. 3 is a block diagram of a data PDU 50, as defined in the 3GPP™ TS 25.322 specification. In general, there are two types of PDUs: a control PDU or a data PDU. Control PDUs are used by layer 2 to control data transmission and reception protocols. Data PDUs are used to transmit acknowledged mode data, which is then reassembled and presented to layer 3. The example PDU 50 is a data PDU, and is divided into several fields, as defined by the layer 2 protocol. The first field 51 is a single bit indicating that the PDU 50 is either a data or a control PDU. As the data/control bit 51 is set (i.e., equal to 1), the PDU 50 is marked as an acknowledged mode data PDU. The second field 52 is a sequence number (SN) field, and is twelve bits long. Successive PDUs have successively higher sequence numbers, and in this way a receiver can properly reassembled layer 2 PDUs to form layer 2 SDUs. That is, if a first PDU is transmitted with an SN equal to 536, the next PDU would be transmitted with an SN equal to 537, and so forth. A single polling bit 53 follows the SN field 52, and when set indicates that the receiver should respond with an acknowledgment status PDU, which is one kind of control PDU, and which will be introduced later. Bit 54 is reserved and is set to zero. The next bit 55$a$ is an extension bit, and when set indicates the presence of a following length indicator (LI). An LI may be either 7 bits long or 15 bits long, and is used to indicate the ending position of a layer 2 SDU within the layer 2 PDU. If a single SDU completely fills the data region 58 of the PDU 50, then the bit 55$a$ would be zero, thereby indicating that no LI is present. In the example PDU 50, however, there are two layer 2 SDUs ending in the layer 2 PDU 50: SDU1 57$a$ and SDU2 57$b$. There must, therefore, be two LIs to indicate the respective ends of the SDU1 57$a$ and the SDU2 57$b$. A PDU following the PDU 50 would hold the LI for SDU3 57$c$. The first LI, LI1, is in field 56$a$ following the extension bit field 55$a$, and marks the end of the SDU1 57$a$. LI1 56$a$ has an extension bit 55$b$ that is set, indicating the presence of another LI, LI2 in field 56$b$. LI2 56$b$ indicates the ending position of the SDU2 57$b$, and has an extension bit 55$c$ that is cleared, signifying that there are no more LIs, and that the data region 58 is thus beginning.

The fact that the SN field 52 has a fixed bit length presents the peculiar fact that it is possible for layer 2 PDUs having higher SN values to be sequentially before layer 2 PDUs having lower SN values. To better understand this, please refer to FIG. 4. FIG. 4 is a phase diagram 60 of a sequence number transmission cycle. SN values behave very much like time values on a clock, due to overflow of the 12 bits in the SN field 52. For example, an initial PDU may have an SN value of 0 (shown at position 66), followed by a PDU with an SN=1 (at position 61), and another with an SN=2, etc. The PDU SN values continue incrementing with each PDU, passing the 1024 mark at position 62, the 2048 mark at position 63, the 3072 mark at position 64 and finally reaching a maximum value of 4095 at position 65. At 4095, the SN overflows when incremented, and returns to zero, just as 23:00 hours overflows to 0:00 hours at midnight.

Thus, a layer 2 PDU with an SN=2 might be sequentially before a layer 2 PDU with an SN=1000, and yet sequentially after a layer 2 PDU with an SN=4092. If great care is not taken, this inequality of PDU sequentiality with SN numerical ascendancy can lead to confusion.

In the following discussion, receivers and transmitters may be either base stations or a mobile units. The term PDU is used to indicate a layer 2 PDU, and the term SDU is used to indicated a layer 2 SDU. A receiver has a receiving window that is delimited by two state variables: VR(R) and VR(MR). VR(R) marks the beginning of the receiving window, and VR(MR) marks the end of the receiving window. The receiver expects to receive only PDUs that have SN values that land within the receiving window. Other PDUs are discarded. To better understand this, please refer to FIG. 5. FIG. 5 is a phase diagram 70 for a receiving window 73. In FIG. 5, the receiving window 73 has a VR(R)=3852 at position 71, and a VR(MR)=206 at position 72. At position 74, the SN values roll over to zero. The receiving window 73 thus has a width of 450 PDUs. VR(MR) is always kept a fixed PDU SN value distance away from VR(R). That is, VR(MR)=VR(R)+the receiving window width (i.e., 450). As PDUs are received, the receiver advances VR(R), and thus advances the receiving window 73. VR(R) may not advance past any PDU that has not yet been properly received.

Please refer to FIG. 6. FIG. 6 is a phase diagram 80 for a transmitting window 83. In a manner analogous to the receiver, a transmitter has a transmitting window 83 that is delimited by two state variables: VT(A) and VT(MS). VT(A) marks the beginning of the transmitting window 83, and VT(MS) marks the end of the transmitting window 83. For FIG. 6, VT(A)=3752 at position 81, and VT(MS)=106 at position 82. Again, roll over to zero occurs at position 84. The transmitting window 83 is thus also 450 PDUs wide. The transmitter may only transmit PDUs that have SN values falling within the range of the transmitting window 83. The transmitter advances VT(A), and thus advances the transmitting window 83, upon reception of an acknowledgment status PDU from the receiver. The acknowledgment status PDU contains the most recent value of VR(R) from the receiver, and is sent periodically or upon receipt of a PDU with the polling bit 53 set. When an acknowledgment status PDU is received, the transmitter sets the state variable VT(A) equal to the VR(R) value contained in the acknowledgment status PDU. In this manner, the transmitting window 83 should ideally move forward in lock step with the receiving window 73.

As the receiving window 73 and the transmitting window 83 advance with each other, PDUs stream from the transmitter and are assembled into corresponding SDUs by the receiver. These SDUs are then passed in order to layer 3. As noted previously, under certain transmission modes the communications protocol requires that SDUs be delivered to layer 3 fully and in sequence. However, the protocol does allow SDUs to be discarded. This may occur, for example, due to a timeout, in which the data in the SDU is no longer relevant. A layer 2 transmitter can send control PDUs to a receiver indicating which SDUs are to be discarded. Upon reception of this control PDU, the receiver adjusts its receiving window 73 accordingly, and informs its layer 3 of the SDUs that have been discarded. This control PDU for discarding SDUs is termed a Move Receiving Window (MRW) request PDU. Please refer to FIG. 7. FIG. 7 shows an MRW super-field 90 in an MRW request PDU 91. The MRW super-field 90 comprises a type field 92 of four bits that identifies the PDU 91 as an MRW request PDU, a length field 93 of four bits for indicating the number of subsequent SN_MRW entries 94, and an $N_{Length}$ field 95 of four bits. Each SN_MRW entry 94 is used to indicate the end of a discarded SDU, and contains the SN value for the PDU that holds the end of the discarded SDU. The last entry 94, SN_MRW$_{Length}$, together with the $N_{Length}$ entry 95 inform the receiver how the state variable VR(R) should be set. The $N_{Length}$ entry 95 indicates how many LIs and corresponding data in the SN_MRW$_{Length}$ PDU should be discarded. The length field 93 may hold a special case value of zero, which indicates that the MRW request PDU 91 holds a single SN_MRW entry 94 that extends beyond a transmitting window of the transmitter.

To better understand the above, please refer to FIG. 8 and FIG. 9. FIG. 8 is a diagram of a string of SDUs 100. FIG. 9 illustrates a sample MRW super-field 110 for discarding a portion of the SDUs 100 shown in FIG. 8. In FIG. 8, individual PDUs that carry the SDUs 100 are marked with dotted lines. SDU_11 ends in a PDU 101 having an SN value of 90. SDU_12 ends in a PDU 102 having an SN value of 95. SDU_13 and SDU_14 both end in a PDU 103 having an SN value of 96. Finally, SDU_15 begins in a PDU 104 with an SN value of 97. To discard SDU_11, SDU_12 and SDU_13, a transmitter builds the MRW super-field 110 and sends the MRW super-field 110 to the receiver as an MRW request PDU 111. The type field 112 is set to an MRW type indicator. The length field 113 holds a value of three, indicating that three SN_MRW entries follow. SN_MRW$_1$ entry 114 is set to 90, indicating the end position of SDU_11 that is to be discarded, corresponding to PDU 101. The second entry SN_MRW$_2$ is set to 95, indicating that SDU_12, which is to be discarded, ends in PDU 102. Finally, the last entry SN_MRW$_3$ 116 together with N$_3$ 117 equal to 1 indicates that the first LI in PDU 103, and the data the LI references, are to be discarded. This corresponds, then, to throwing out SDU_13. SDU_14, on the other hand, is kept.

Please refer to FIG. 10 with reference to FIG. 8. FIG. 10 illustrates another MRW super-field 120. A special case exists when a transmitter wishes to discard a single SDU that extends outside the transmitter window. For example, arrow 106 in FIG. 8 represents the end of the transmitting window, which is at an SN value of 98. That is, VT(MS)=98. SDU_15, however, ends in a PDU 105 that has an SN value of 99, which is beyond VT(MS). To discard SDU_15, the transmitter creates the MRW super-field 120 with a length field 123 having a value of zero. A zero value in the length field 123 indicates to the receiver that a single SDU is being discarded that extends beyond the range of the transmitting window. SDU_15 ends in PDU 105 having an SN value of 99, so the SN_MRW$_1$ field 124 is set to 99. The last field 125, the so-called $N_{Length}$ field, is set to one, indicating that the first LI in PDU 105, and the data so referenced, is to be discarded.

Please refer to FIG. 11. FIG. 11 is an SN phase diagram 130 for SDUs ending at 132a and 132b to be discarded. Both a transmitter and a receiver (not shown) share an identical window 134 that is 600 PDUs wide, having a starting point 134a with an SN value of 3696, and an ending point 134b with an SN value of 200. That is, for the receiver, VR(R)= 3696 at point 134a, and VR(MR)=200 at point 134b, forming the receiving window 134. Similarly, for the transmitter, VT(A)=3696, and VT(MS)=200, forming the transmission window 134. Point 131 indicates an SN value of zero. The transmitter wishes to discard two SDUs: the SDU ending at position 132a having an SN value of 3796, and the SDU ending at position 132b, sequentially after the position 132a, having an ending SN value of 450. Please refer to FIG. 12 with reference to FIG. 11. FIG. 12 illustrates an MRW request PDU 141 holding an MRW super-field 140 to effect the SDU discards of FIG. 11. Type field 142 indicates that the PDU 141 is an MRW request PDU. Length field 143 has a value of three, indicating that three SN_MRW entries follow. SN_MRW$_1$ 144 marks the ending PDU at point 132$a$ of the first discarded SDU. SN_MRW$_2$ 145 marks the ending PDU at point 132$b$ of the second discarded SDU. The SDU ending at position 132$b$ totally fills its final PDU, and hence the final SN_MRW entry 146 in the MRW super-field 140 holds a value of 451, and the N field 147 holds a value of zero. The final fields 146 and 147 indicate to the receiver that all data is to be kept in the PDU having an SN value of 451, whereas all the data is to be discarded in the PDU having an SN value of 450.

When processing the MRW super-field 140 in the MRW request PDU 141, the receiver must determine the sequence order of the SDU 132$b$, as given by SN_MRW$_2$ field 145. As the sequencing is circular, the SDU 132$b$ may be after the end of the receiving window 134, i.e., be sequentially after VR(MR) at 134$b$. This is, in fact, the intention of the transmitter. However, it is also possible that the SDU 132$b$ was meant to indicate an SDU that was sequentially before the start of the receiving window 134, i.e., sequentially before VR(R) at 134$a$. To properly resolve this ambiguity, the protocol states that if any SDUs land within the receiving window 134, then other SDUs outside of the receiving window 134 are to be considered after VR(MR), i.e., after the end of the receiving window 134 at the point 134$b$. On the other hand, if none of the SDUs land within the receiving window 134, then all of the SDUs are to be considered before VR(R), i.e., before the start of the receiving window 134 at point 134$a$. As the SDU 132$a$ lies within the receiving window 134, using this protocol, the receiver properly recognizes that the SDU ending at 132$b$ is sequentially after VR(MR) at 134$b$.

Please refer to FIG. 13. FIG. 13 is an alternative SN phase diagram 150 for the SDUs indicated in FIG. 11 and FIG. 12. Item numbers in FIG. 11 and FIG. 13 are kept identical for those items that are identical in nature. In FIG. 11, both the receiving window and the transmitting window lay upon the same window 134. This is not the general case, however. In general, the receiving window will advance beyond the transmitting window since the receiver reports an acknowledgement status on a periodic base or after it receives a poll from the transmitter, which does not trigger a poll with every PDU. Additionally, the transmitter may occasionally fail to receive an acknowledgment status PDU from the receiver, and thus will not update its transmitting window to reflect the new state of the receiving window. In FIG. 13, arrow 136 indicates the extents of a transmitting window, with VT(A) at point 136$a$ having an SN value of 3696, and VT(MS) at point 136$b$ with an SN value of 200. This is identical, then, to the window 134 of FIG. 11. Arrow 138 represents the extents of the receiving window, which has advanced 200 PDU units past the transmitting window 136. The receiving window 138 has a VR(R) value of 3896 at point 138$a$, and a VR(MR) value of 400 at point 138$b$. In this case, when the receiver receives the MRW request PDU 141 of FIG. 12, the indicated SDUs ending at 132$a$ and 132$b$ respectively will be treated differently. As neither 132$a$ nor 132$b$ lie within the receiving window 138, the receiver will treat both respective SDUs as being prior to VR(R) at point 138$a$, and hence ignore the SDU discard request for the SDU ending at 132$b$. That is, the receiver will believe that the SDUs ending at 132$a$ and 132$b$ have already been received, and hence will not discard the SDU ending at 132$b$ as requested by the transmitter. The sequential ordering of the SDU ending at 132$b$ is misconstrued by the receiver protocol rules.

SUMMARY OF THE INVENTION

It is therefore a primary objective of this invention to provide a method for determining the sequential ordering of layer 2 protocol data units (PDUs) in a move receiving window (MRW) request sent to a receiver in a wireless communications system to discard at least one layer 2 service data unit (SDU)

Briefly summarized, the preferred embodiment of the present invention discloses building a layer 2 MRW super-field that has a PDU sequence number for each layer 2 SDU to be discarded. Within the MRW super-field there is an initial sequence number that is arranged within the MRW super-field according to a packing algorithm. The MRW super-field is transmitted to the receiver, and the receiver extracts the initial sequence number. The receiver then assumes that all other PDU sequence numbers within the MRW super-field are sequentially after the initial sequence number to effect the discarding of layer 2 SDUs.

It is an advantage of the present invention that by establishing a reference sequence number, the receiver is able to properly determine the correct ordering of layer 2 PDUs when discarding layer 2 SDUs, and thus the receiver will not mistakenly discard or accept incorrect layer 2 SDUs.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

In the following description, a communications protocol as disclosed in the 3GPP™ specification TS 25.322, V3.4.0, is used by way of example. However, it should be clear to one in the art that any wireless communications protocol that suffers from ambiguity of layer 2 sequence numbers when discarding layer 3 data can benefit from the method and system of the present invention.

It is the method of the present invention to build a Move Receiving Window (MRW) super-field with layer 2 protocol data unit (PDU) sequence numbers that are packed according to the sequentiality of the sequence numbers. Specifically, an initial sequence number is packed within the MRW super-field according to a packing algorithm. All other sequence numbers in the MRW super-field are sequentially after this initial sequence number. The MRW super-field is sent to the receiver, and the receiver extracts the initial sequence number from the MRW super-field using an extraction algorithm. The receiver then assumes that all other sequence number within the MRW super-field are sequentially after the initial sequence number.

Figure 1:
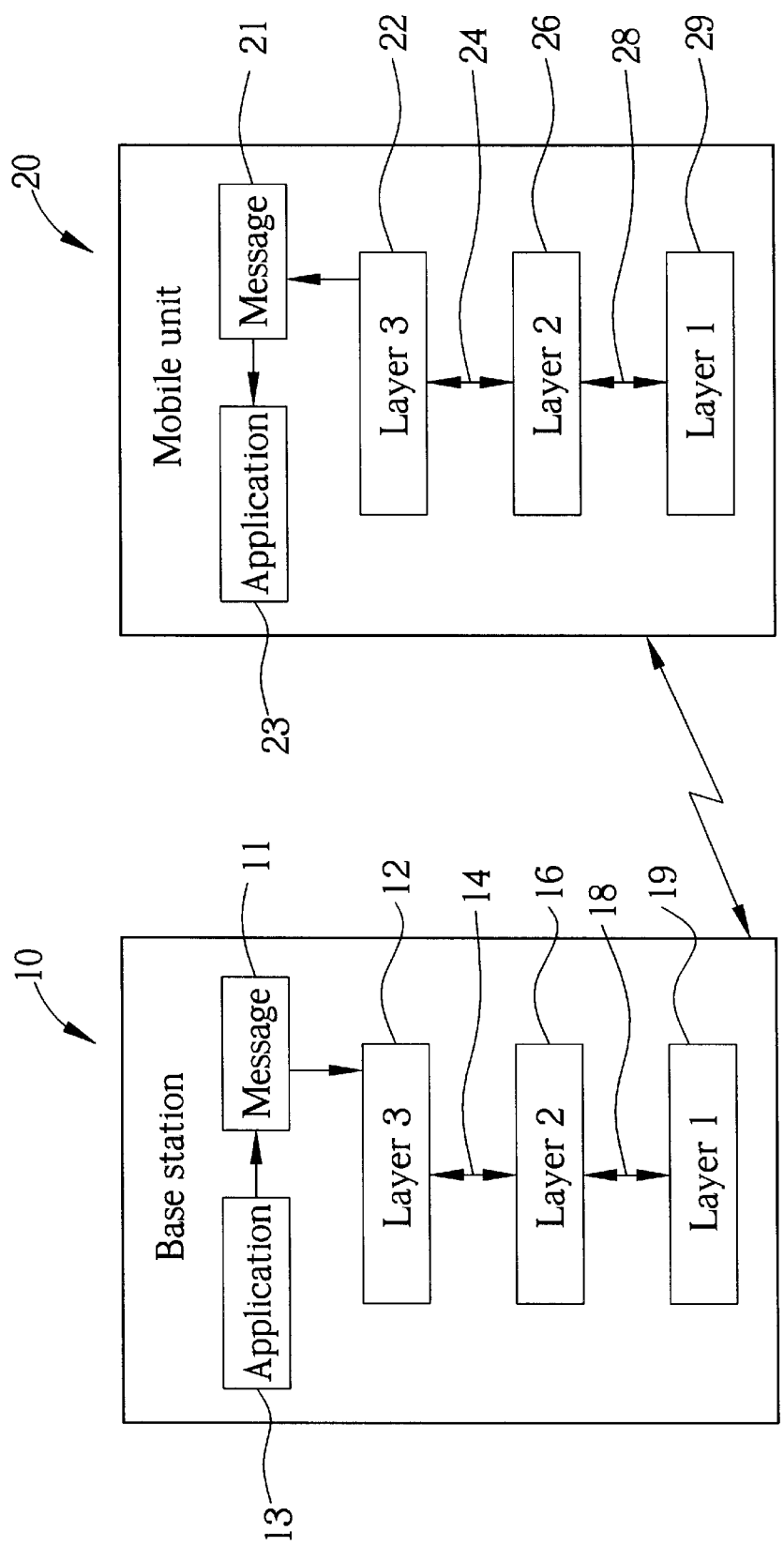
FIG. 1 is a block diagram of a three-layer communications protocol.
Figure 2:
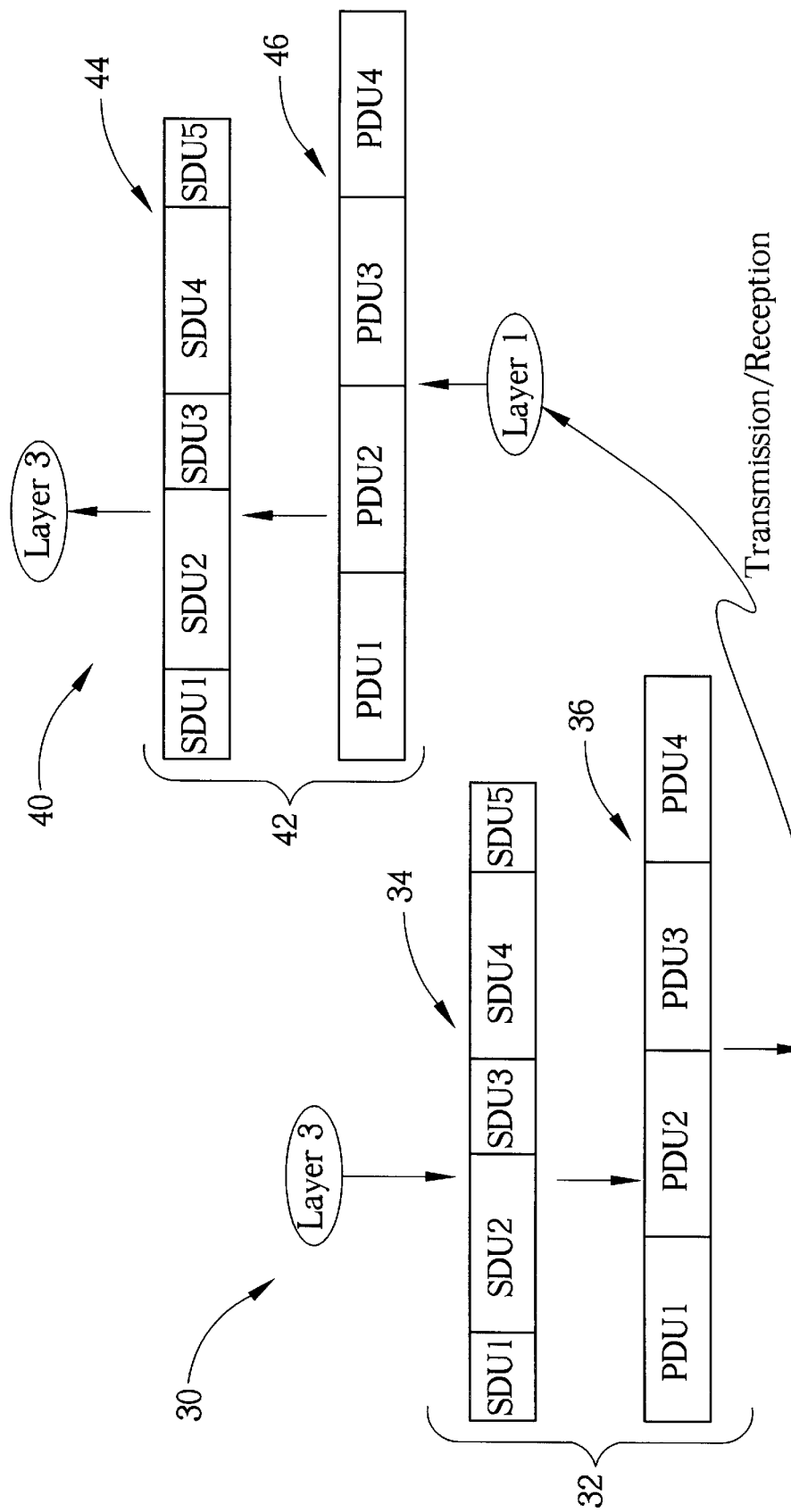
FIG. 2 is a diagram of a transmission/reception process from a layer 2 perspective.
Figure 3:
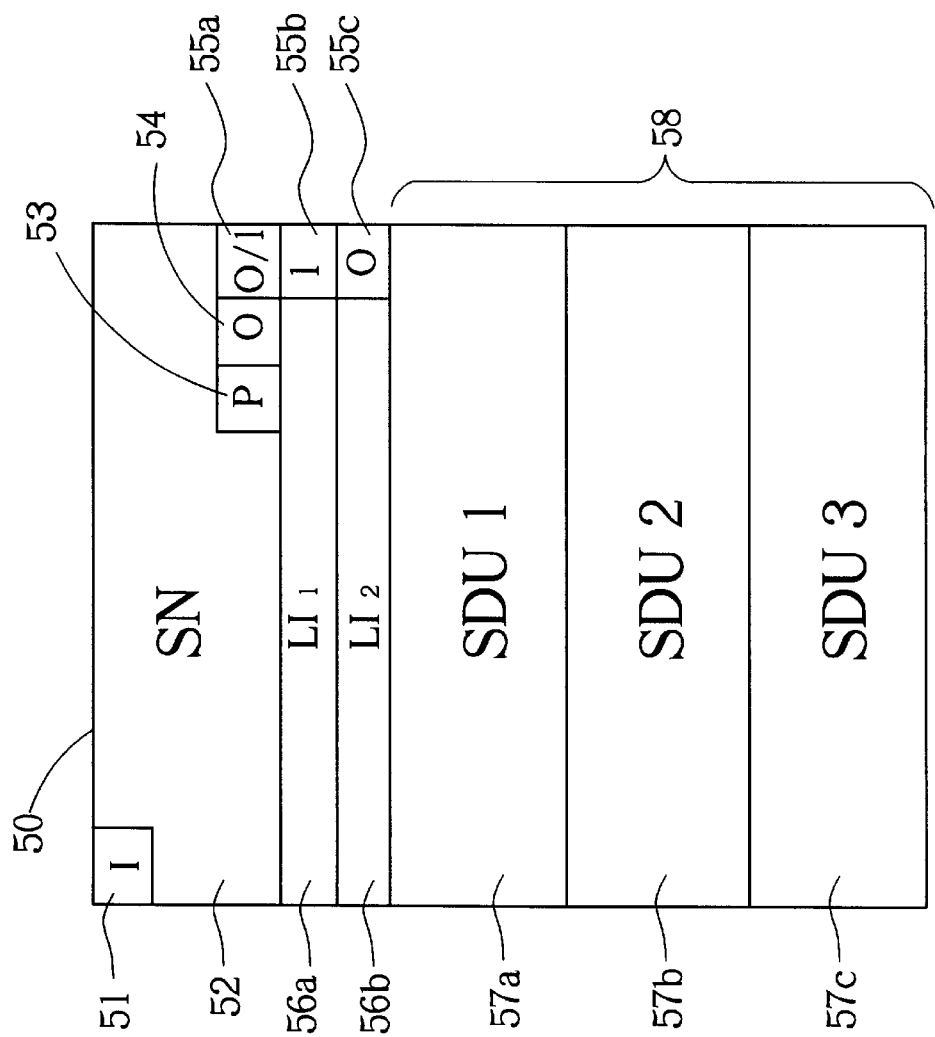
FIG. 3 is a block diagram of a layer 2 protocol data unit (PDU).
Figure 4:
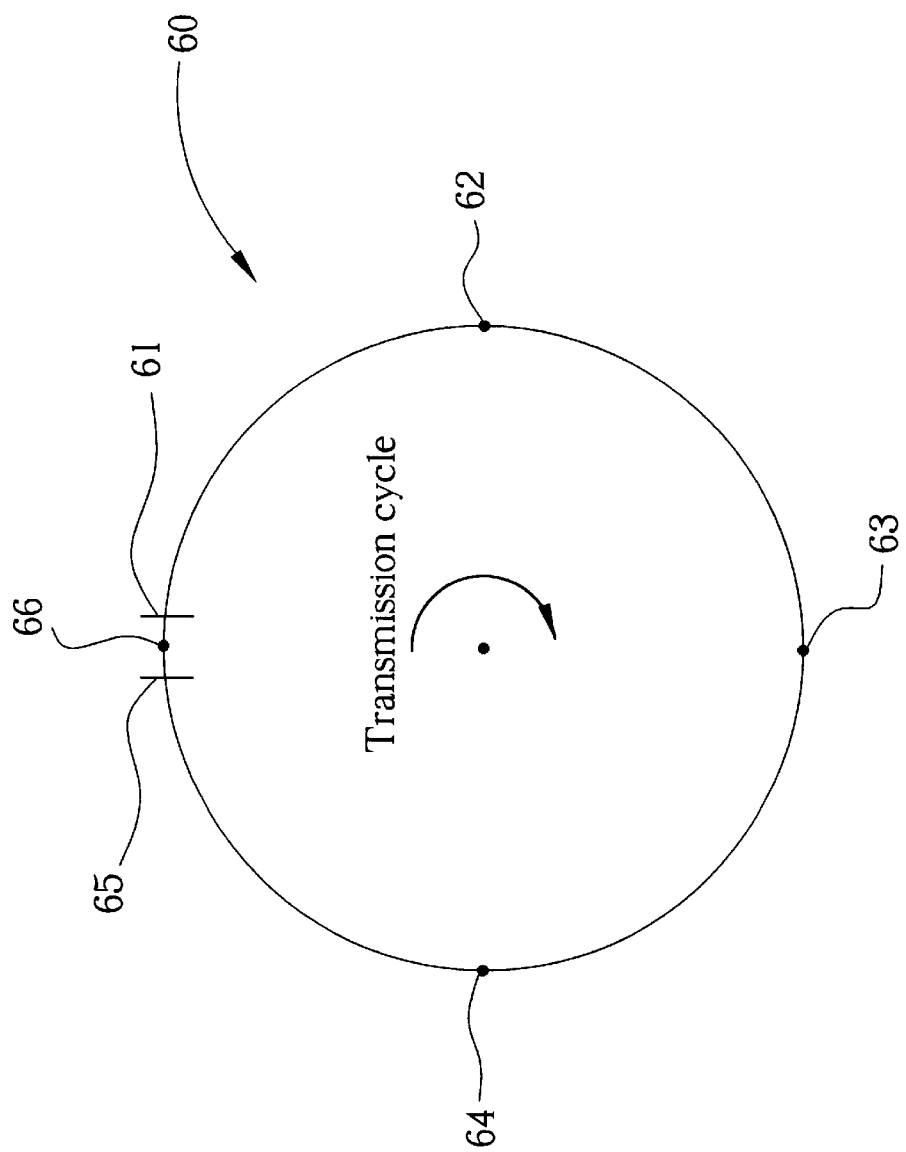
FIG. 4 is a phase diagram of a sequence number transmission cycle.
Figure 5:
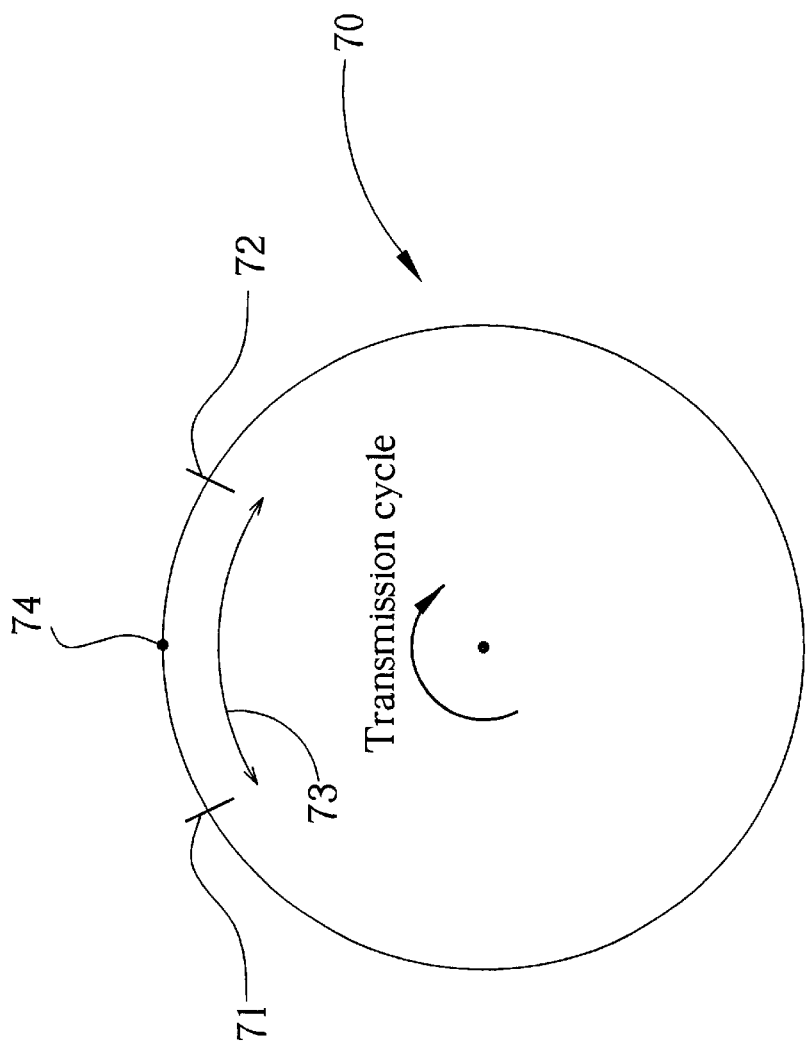
FIG. 5 is a phase diagram for a receiving window.
Figure 6:
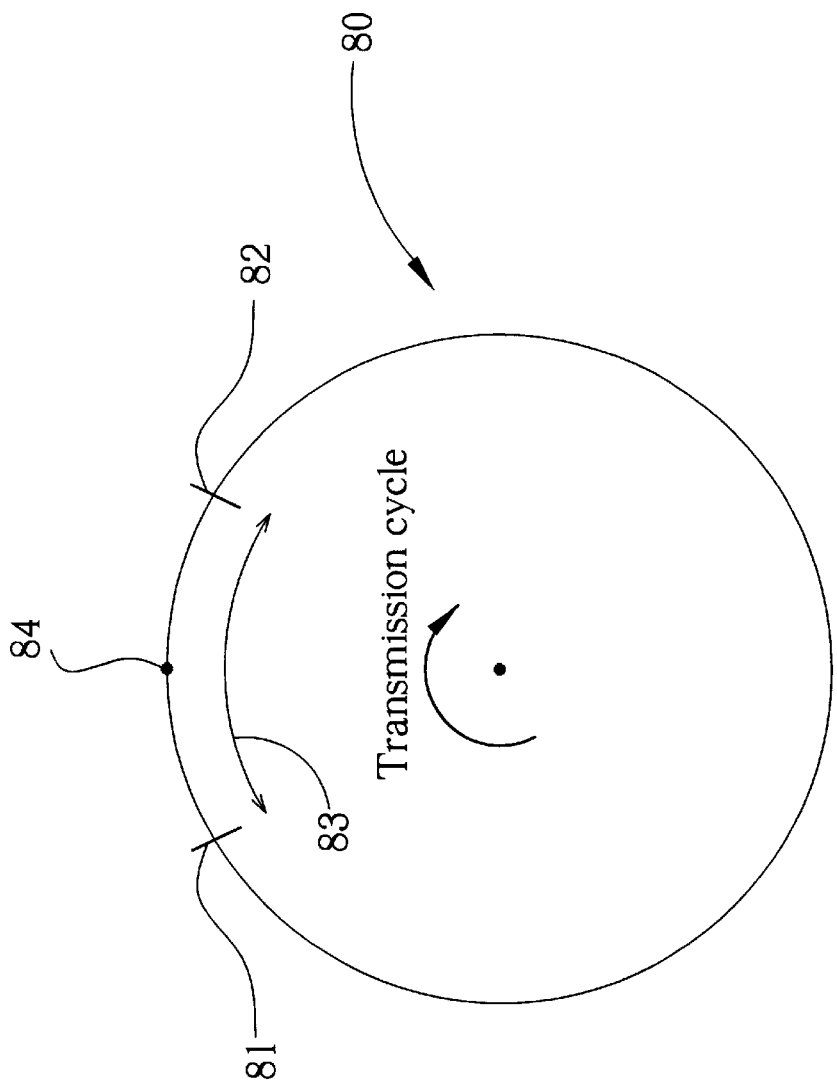
FIG. 6 is a phase diagram for a transmitting window.
Figure 7:
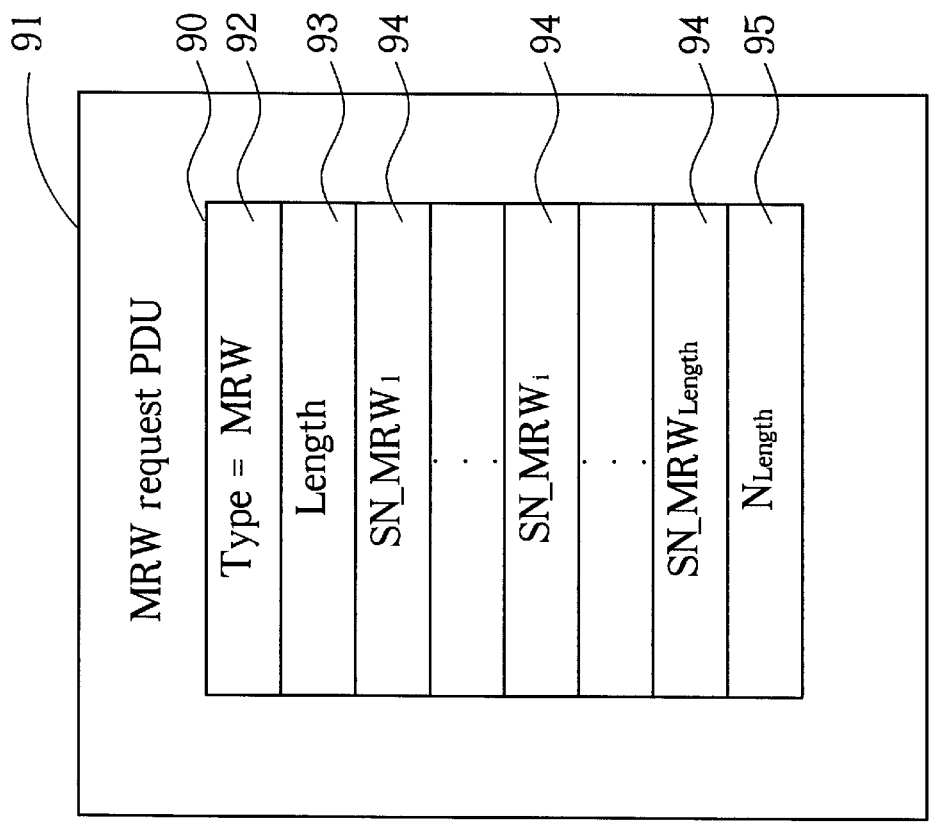
FIG. 7 shows a move receiving window (MRW) super-field in an MRW request PDU.
Figure 8:
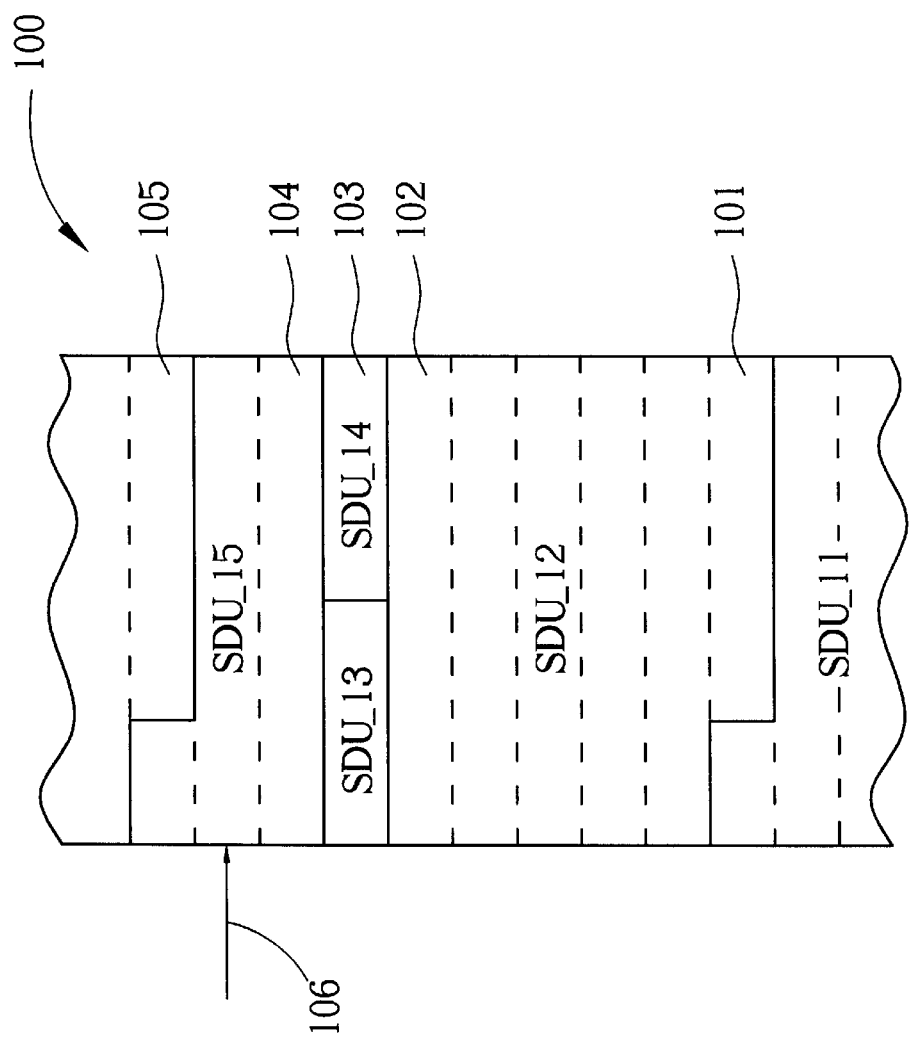
FIG. 8 is a diagram of a string of layer 3 service data units (SDUs).
Figure 9:
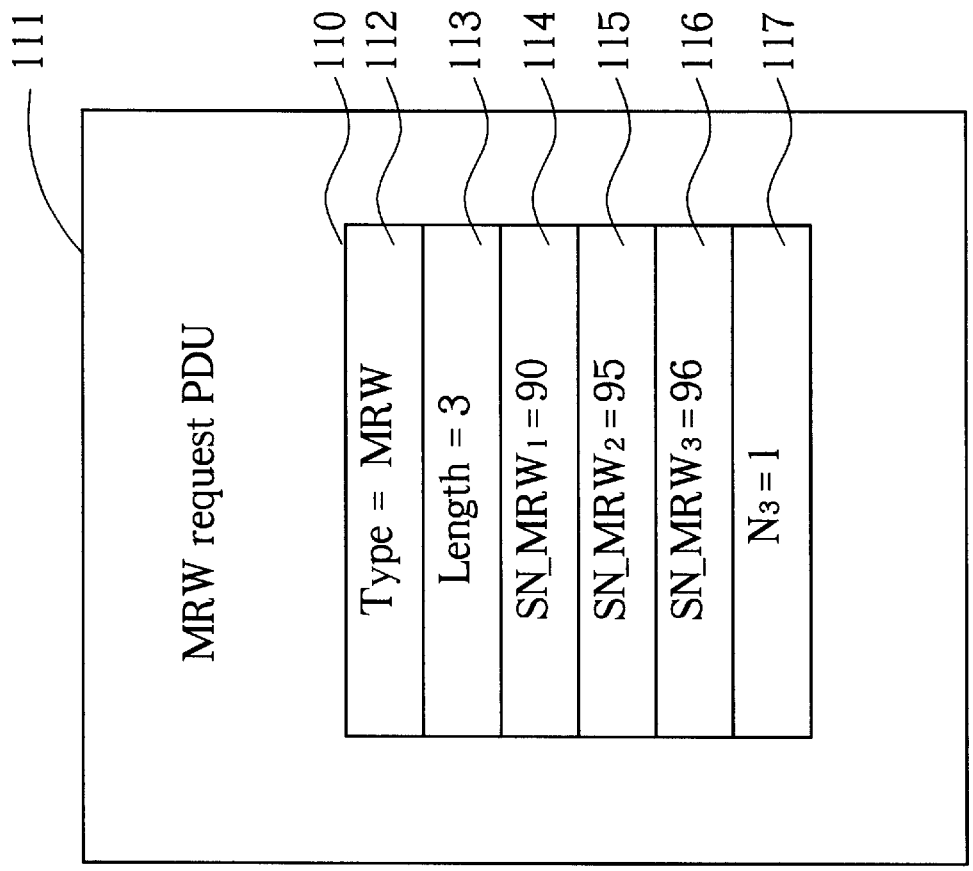
FIG. 9 illustrates a sample MRW super-field for discarding a portion of the SDUs shown in FIG. 8.
Figure 10:
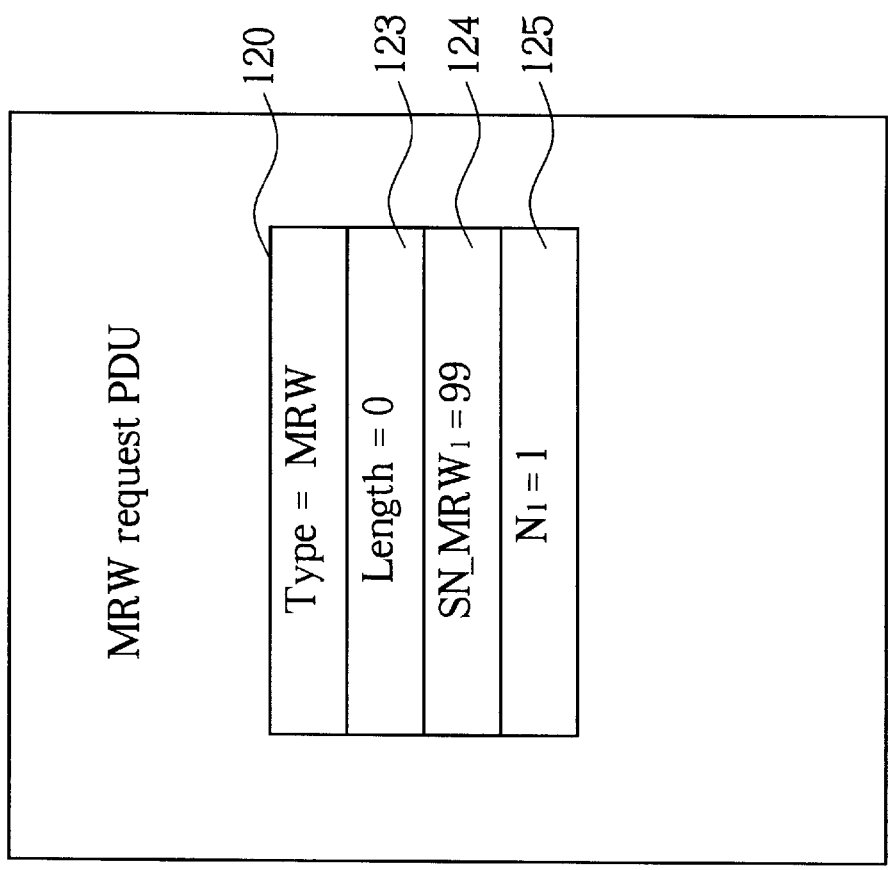
FIG. 10 illustrates another MRW super-field.
Figure 11:
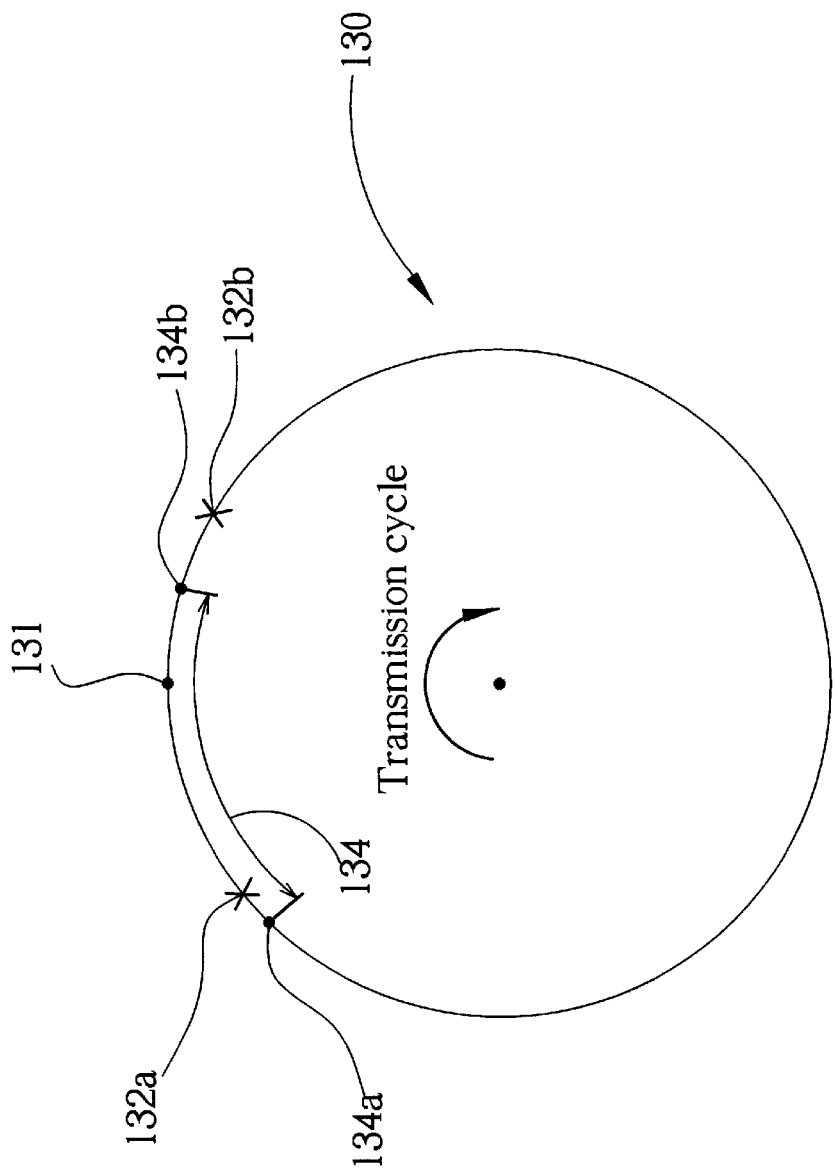
FIG. 11 is a sequence number (SN) phase diagram for SDUs to be discarded.
Figure 12:
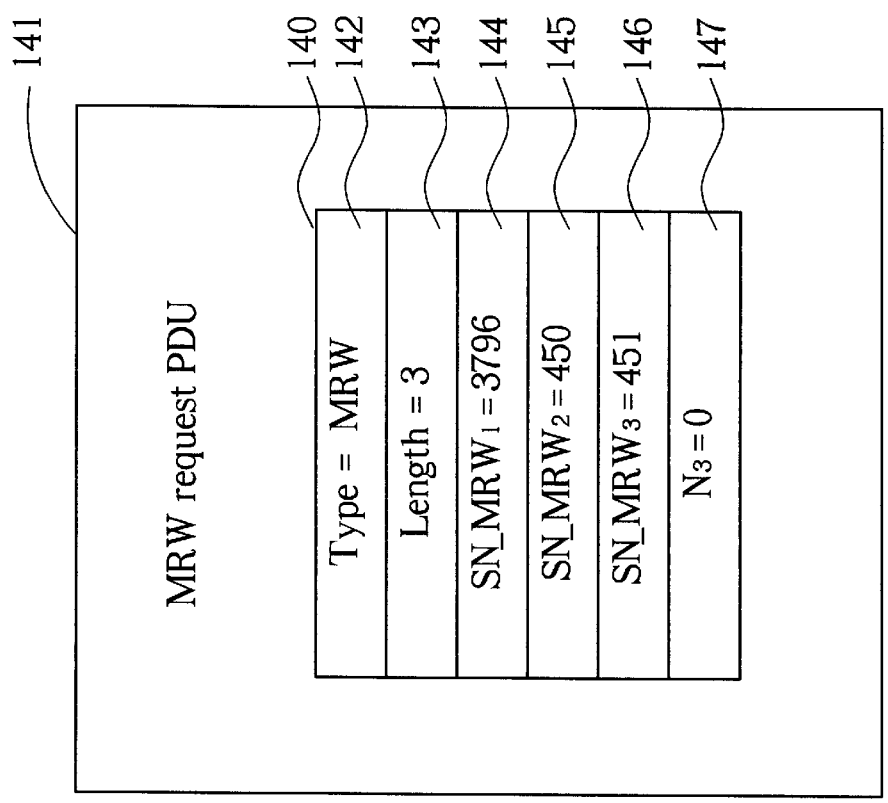
FIG. 12 illustrates an MRW request PDU holding an MRW super-field to effect the SDU discards of FIG. 11.
Figure 13:
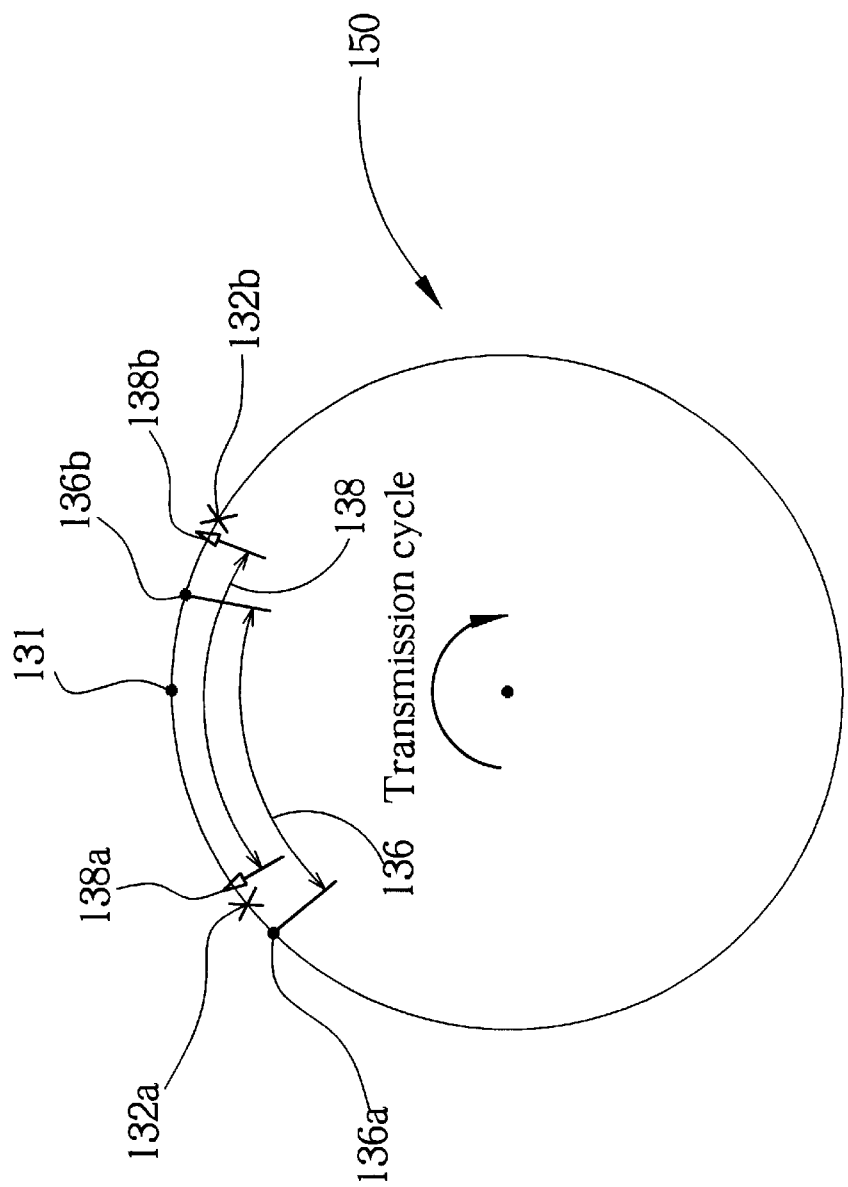
FIG. 13 is an alternative SN phase diagram for the SDUs indicated in FIG. 11 and FIG. 12.
Figure 14:
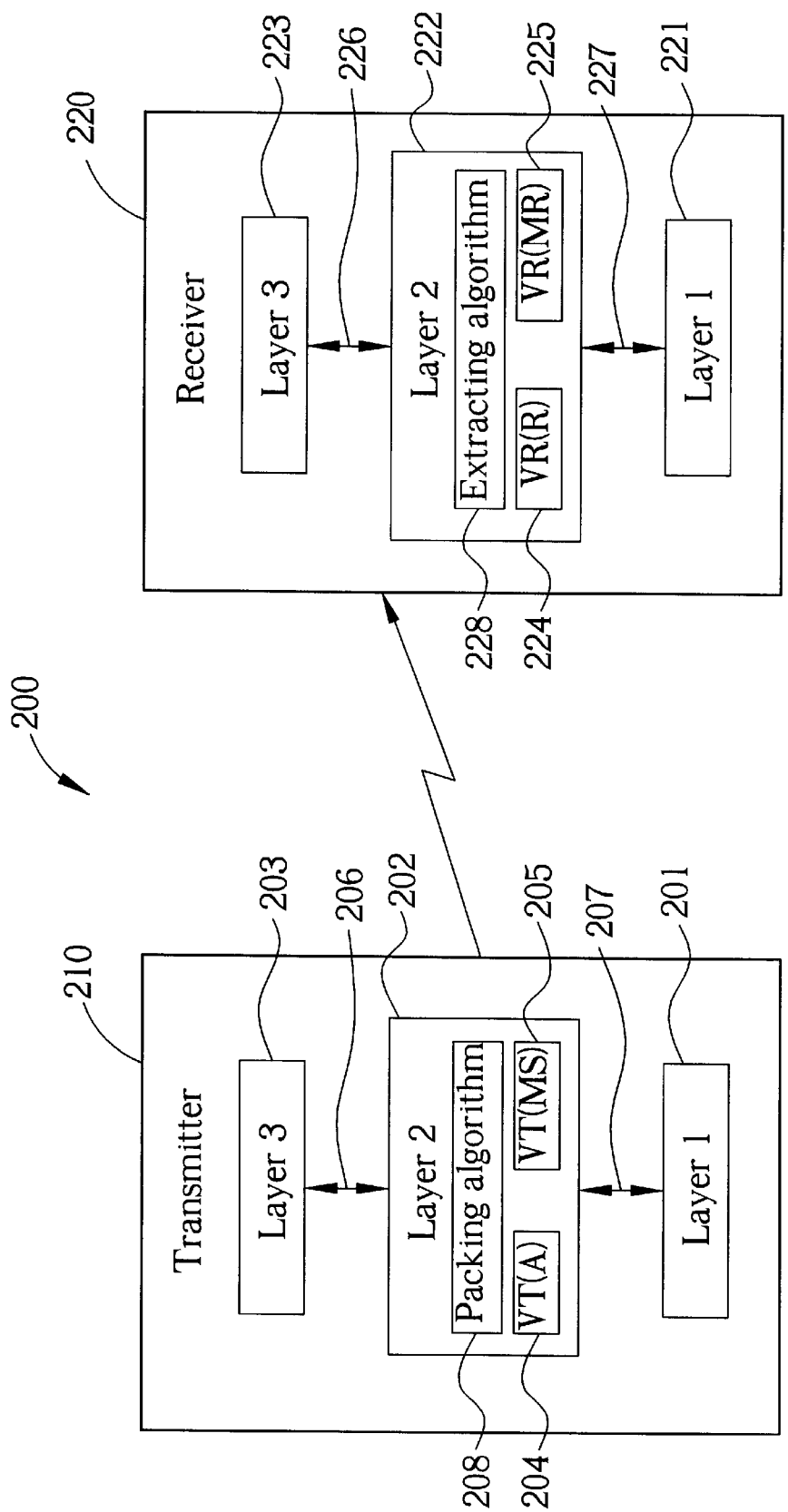
FIG. 14 is a block diagram of a communications system according to the method of the present invention.

Please refer to FIG. 14. FIG. 14 is a block diagram of a communications system 200 that utilizes the method of the present invention. The communications system 200 comprises a transmitter 210 and a receiver 220. The transmitter 210 uses a three-layer communications protocol, comprising a layer 1 interface 201, a layer 2 interface 202 and a layer 3 interface 203. The receiver 220 uses a similar protocol, and has a layer 1 interface 221, a layer 2 interface 222 and a layer 3 interface 223. Layer 2 service data units 206 and 226 (SDUs) are exchanged between layers 2 and 3, and layer 2 protocol data units (PDUs) 207 and 227 are exchanged between layers 1 and 2. The form and functionality of the transmitter 210, the receiver 220, layer 2 SDUs 206 and 226, and layer 2 PDUs 207 and 227 are nearly identical to that of the disclosed prior art. However, the layer 2 interfaces 202 and 222 of the present invention communications system 200 have additional functionality to determine sequence number (SN) ordering of layer 2 PDUs when processing a move receiving window (MRW) request. The layer 2 interface 202 of the transmitter 210 comprises a packing algorithm 208 that is used when building an (MRW) super-field in an MRW request PDU. The packing algorithm 208 orders the layer 2 PDU SN values within the MRW super-field according to the sequentiality of the SN values. Similarly, the layer 2 interface 222 within the receiver 220 comprises an extracting algorithm 228 that enables the receiver 220 to determine the sequentiality of SN values within an MRW super-field as packed by the transmitter 210. The extracting algorithm 228 can be loosely thought of as the inverse function of the packing algorithm 208. In the present invention, the packing algorithm 208 simply places the SN values into the MRW super-field in increasing sequential order. The extracting algorithm 228 thus assumes that the MRW super-field SN values are in sequential order, from sequentially first to sequentially last layer 2 PDU SN values. Other packing 208 and extracting 228 algorithms are certainly possible, however. The key point is that the packing algorithm 208 and extracting algorithm 228 together enable the receiver 220 to determine layer 2 PDU SN value sequentiality in an MRW super-field. In particular, the packing algorithm 208 enables the receiver 220 to extract a reference point SN value from an MRW super-field. In the preferred embodiment, this reference point SN value is sequentially before all other SN values in the MRW super-field. Other reference points are also possible. Regardless of what reference point SN value is used, though, an initial value that is sequentially before all other SN values will subsequently be found.

Figure 15:
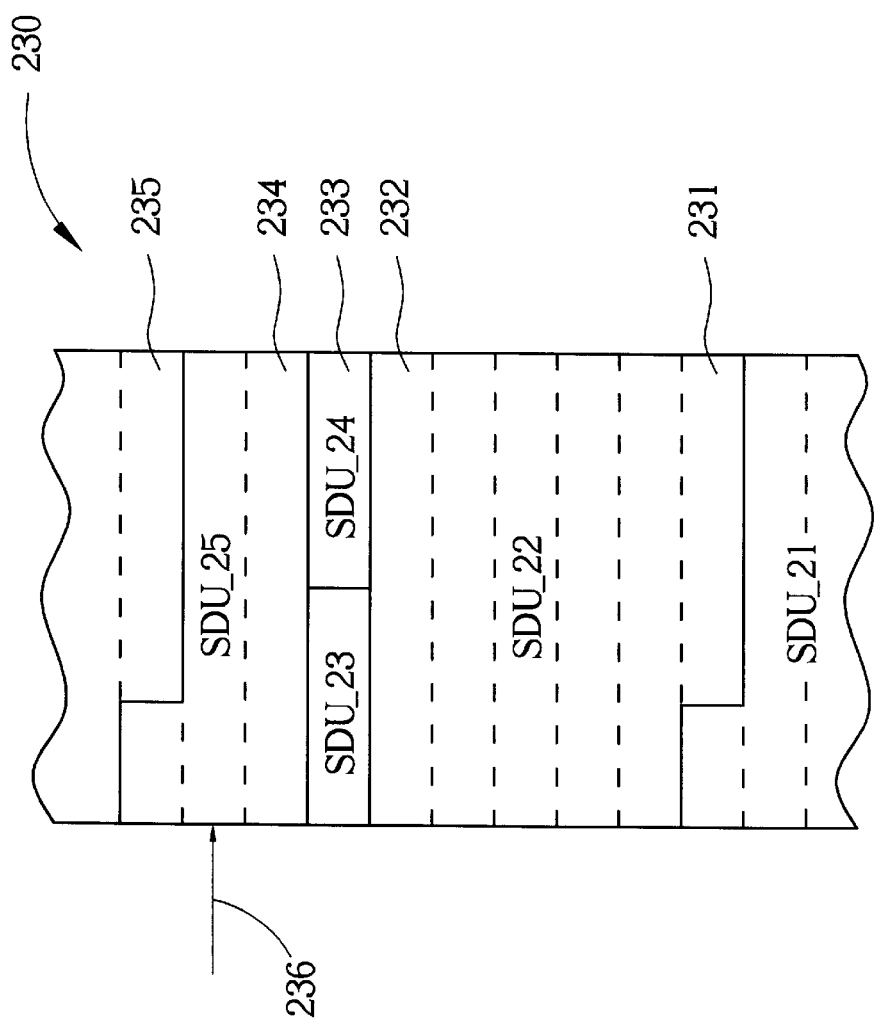
FIG. 15 is a block diagram of SDUs within a string of PDUs.
Figure 16:
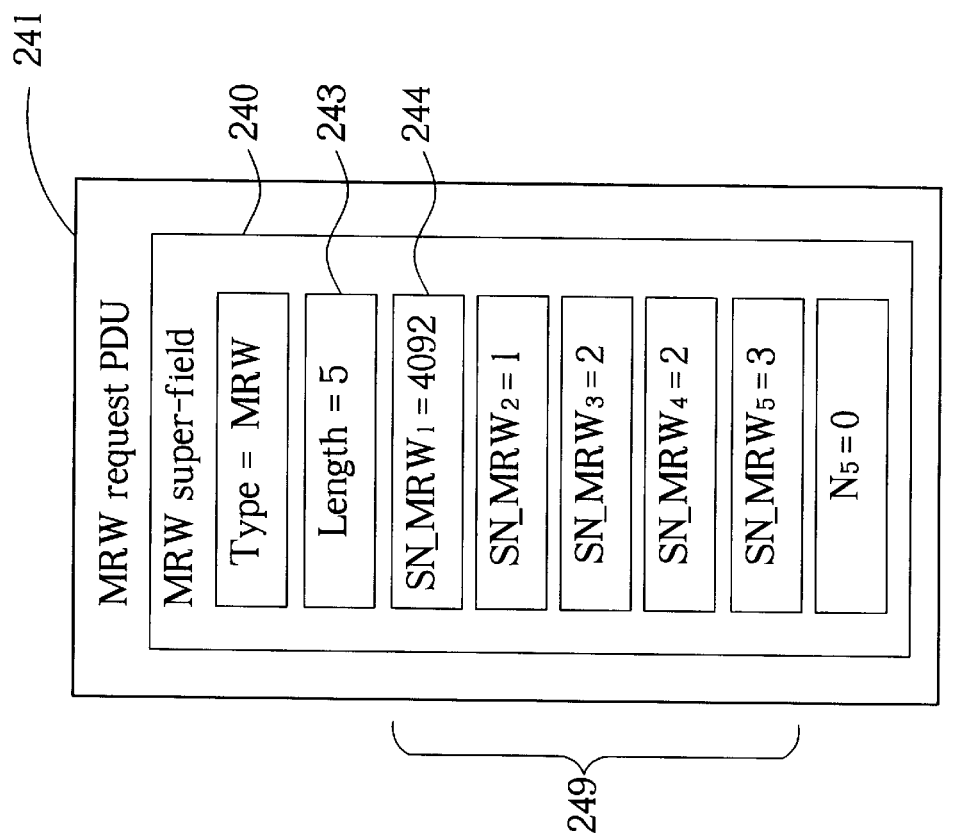
FIG. 16 is a block diagram of an MRW super-field according to the present invention.

In the following discussion, the term PDU is used to indicate layer 2 PDUs. Similarly, the term SDU is used to indicate layer 2 SDUs. To better understand the above-mentioned method of the present invention, please refer to FIG. 15 and FIG. 16, with reference to FIG. 14. FIG. 15 is a block diagram of SDUs 230 within a string of PDUs. FIG. 16 is a block diagram of an MRW super-field according to the present invention. In FIG. 15, a plurality of SDUs 230, labeled SDU_21 to SDU_25, are sent by the transmitter 210 to the receiver 220. The individual PSUs that actually carry the SDUs 230 are indicated by dotted lines. We may imagine, however, that due to a timeout, the transmitter 210 wishes the receiver 220 to discard SDU_21, SDU_22, SDU_23 and SDU_24. The transmitter 210 thus uses the packing algorithm 208 to build an MRW super-field 240 within an MRW request PDU 241, and sends the MRW request PDU 241 to receiver 220. SDU_21 ends in a PDU 231 having an SN value of 4092. SDU_22 ends in a PDU 232 with an SN value of 1, due to subsequent roll-over of the 12 bits in the SN field of the PDU, as disclosed in the prior art. SDU_23 and SDU_24 both end in a PDU 233 having an SA value of 2. Finally, SDU_25 begins in PDU 234, which has an SN value of 3. The packing algorithm 208 builds the MRW super-field 240 so that the PDU SN values are in increasing sequential order. Specifically, the SN value of the initial PSU 231, after which all the other PDUs 232, 233 and 234 follow, is placed within the firstSN_MRW field 244, immediately after the length field 243.

After receiving the MRW request PDU 241, the extracting algorithm 228 within the receiver 220 uses the following assumptions to determine the proper sequential ordering of the PDU SN values within the SN_MRW fields 249 of the MRW super-field 240:

1) If the length field 243 is the special case value of zero, then the transmitter 210 is requesting a discard of a single SDU that extends up to or beyond the transmitter state variable VT(MS) 205, which marks the first SN outside of the transmitting window. The MRW super-field 240 thus has only one SN_MRW field, and this single SN_MRW entry is assumed to be sequentially after state variable VR(R) 224, which is the starting point of the receiving window of the receiver 220.

2) If the length field 243 is non-zero, then the first SN_MRW entry 244 after the length field 243 is an initial SN value that is assumed to be sequentially on or before all subsequent SN_MRW field values 249. Additionally, this initial SN value 244 is assumed to be sequentially before state variable VR(MR) 225, which marks the first SN outside of the receiving window of the receiver 220.

In FIG. 16, then, the SN value of 4092 is assumed by the receiver 220 to be sequentially before the SN values of 1, 2 and 3. Additionally, the SN value 4092 is assumed to be sequentially before VR(MR) 225. The other SN values within the SN_MRW fields 249 are then ordered accordingly.

Figure 17:
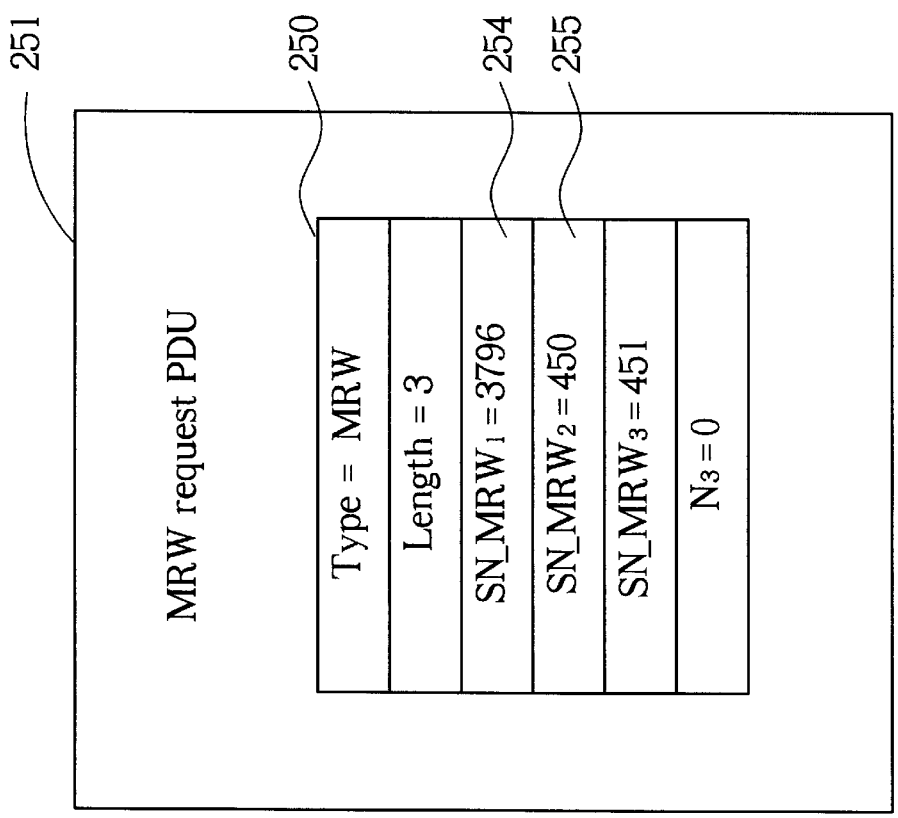
FIG. 17 is a block diagram of an MRW request PDU sent by a transmitter of the present invention to a receiver of the present invention.
Figure 18:
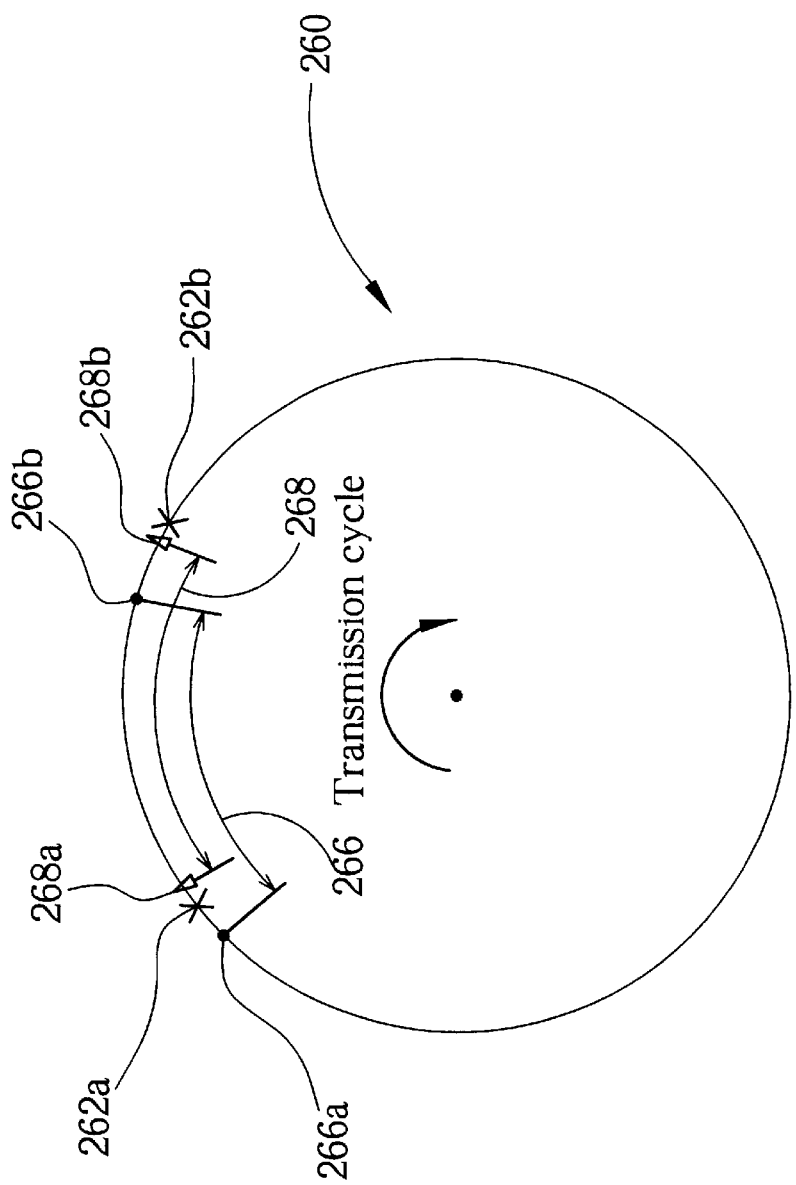
FIG. 18 is an SN phase diagram for a transmitter and receiver shown in FIG. 14.

As a further example of the above, please refer to FIGS. 17 and 18 with reference to FIG. 14. FIG. 17 is a block diagram of an MRW request PDU 251 sent by the transmitter 210 to the receiver 220. FIG. 18 is an SN phase diagram 260 for the transmitter 210 and receiver 220. The MRW request PDU 251 has an MRW super-field 250 that requests discarding of an initial SDU 254 that ends at point 262a with an SN value of 3796, and discarding of a subsequent SDU 255 that ends at point 262b with an SN value of 450. Both the transmitting window 266 and the receiving window 268 are 600 PDU units wide. State variable VT(A) 204 for the transmitter 210 indicates point 266a with an SN value of 3696. State variable VT(MS) 205 of the transmitter 210 indicates point 266b, with an SN value of 200. The receiver 220 has state variable VR (R) 224 indicating point 268a, with an SN value of 3896, and VR(MR) 225 indicating point 268b with an SN value of 400. Upon reception of the MRW super-field 250, the extracting algorithm 228 determines that the first SN_MRW field 254 holds the initial SN value, which is 3796. The receiver thus assumes that point 262a lies before the receiving window 268 end point state variable VR(MR) 225 at point 268b. Additionally, the extracting algorithm assumes that the second SN_MRW entry 255 is sequentially after the initial SN_MRW entry 254. Thus, the receiver 220 properly assumes that the end point 262b of SDU 255 lies sequentially after VR(MR) 225. Hence, the receiver will properly discard SDU 255.

In contrast to the prior art, the present invention provides a method and corresponding system that correctly determines the order of sequence numbers when processing a move receiving window command. The sequence numbers in the move receiving window super-field are packed according to a packing algorithm so that an initial sequence number can be extracted by the receiver using an extraction algorithm. The receiver assumes that all other sequence numbers in the move receiving window super-field are after the initial sequence number.

Finally, it should be noted that the present invention is applicable to various wireless environments, such as mobile telephony, personal data assistants (PDAs), handheld radio-transmitters, etc. Also, it should be clear to one skilled in the art that various physical layers are possible for the implementation of layer 1.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for determining sequential ordering of layer 2 protocol data units (PDUs) during a layer 2 move receiving window (MRW) request sent to a receiver in a wireless communications system by a transmitter to discard at least a layer 2 service data unit (SDU), the method comprising:
    building a layer 2 MRW super-field comprising a: layer 2 PDU sequence number for each layer 2 SDU to be discarded, an initial sequence number arranged within the MRW super-field according to a packing algorithm; and a length field indicating the number of layer 2 PDU sequence numbers in the MRW super-field, a special case value is used for the length field to indicate that the MRW super-field holds a single layer 2 PDU sequence number for a single layer 2 SDU that is to be discarded and that extends beyond a transmitting window of the transmitter;
    transmitting the MRW super-field to the receiver;
    extracting the initial sequence number from the MRW super-field according to an extracting algorithm corresponding to the packing algorithm to enable identification of the initial sequence number;
    assuming layer 2 PDU sequence numbers within MRW super-field are all sequentially on or after the initial sequence number when determining the sequential ordering of layer 2 PDUs for discarding each layer 2 SDUs; and
    assuming the layer 2 PDU sequence number to be sequentially on or after a starting point sequence number of a receiving window of the receiver when the length field holds the special case value.

2. A method according to claim 1 wherein a fixed bit length is used for the layer 2 PDU sequence numbers in the MRW super-field, and roll-over is capable of causing a first sequence number in the MRW super-field to have a lower value than a second sequence number in the MRW super-field, the first sequence number being sequentially after the second sequence number.

3. A method according to claim 1 wherein the MRW super-field comprises either a plurality of layer 2 PDU sequence numbers, or a single layer 2 PDU sequence number without using the special case value for the length field, and the initial sequence number is assumed to be sequentially before an end point sequence number of the receiving window of the receiver.

4. A method according to claim 1 wherein the packing algorithm places all layer 2 PDU sequence numbers in the MRW super-field into ascending sequential order.

5. A method according to claim 1 wherein the special case value is equal to zero.

6. A wireless communications system that uses a layer 2 protocol data unit (PDU) having a move receiving window (MRW) request to discard at least a layer 2 service data unit (SDU), the wireless communications system comprising:
    a transmitter capable of transmitting a layer 2 MRW super-field comprising; a layer 2 PDU sequence number for each layer 2 SDU to be discarded, an initial sequence number arranged within the MRW super-field according to a packing algorithm; and a length field, the length field indicating the number of layer 2 PDU sequence numbers in the MRW super-field, a special case value is used for the length field to indicate that the MRW super-field holds a single layer 2 PDU sequence number for a single layer 2 SDU that is to be discarded and that extends beyond a transmitting window of the transmitter; and
    a receiver capable of receiving the transmitted MRW super-field and extracting the initial sequence number from the MRW super-field according to an extracting algorithm that corresponds to the packing algorithm and that enables identification of the initial sequence number;
    wherein the receiver assumes that the layer 2 PDU sequence numbers within MRW super-field are all sequentially on or after the initial sequence number when determining the sequential ordering of layer 2 PDUs for discarding each layer 2 SDU, and the receiver assumes the layer 2 PDU sequence number to be sequentially on or after a starting point sequence number of a receiving window of the receiver when the length field holds the special case value.

7. A wireless communications system according to claim 6 wherein a fixed bit length is used for the layer 2 PDU sequence numbers in the MRW super-field, and roll-over is capable of causing a first sequence number in the MRW super-field to have a lower value than a second sequence number in the MRW super-field, the first sequence number being sequentially after the second sequence number.

8. A wireless communications system according to claim 6 wherein the MRW super-field comprises either a plurality of layer 2 PDU sequence numbers, or a single layer 2 PDU sequence number without using the special case value for the length field, and the initial sequence number is assumed to be sequentially before an end point sequence number of the receiving window of the receiver.

9. A wireless communications system according to claim 6 wherein the packing algorithm places all layer 2 PDU sequence numbers in the MRW super-field into ascending sequential order.

10. A wireless communications system according to claim 6 wherein the special case value is equal to zero.

11. A method for determining sequential ordering of layer 2 protocol data units (PDUs) during a layer 2 move receiving window (MRW) request sent to a receiver in a wireless communications system by a transmitter to discard at least a layer 2 service data unit (SDU), the method comprising:

building a layer 2 MRW super-field comprising a layer 2 PDU sequence number for each layer 2 SDU to be discarded, an initial sequence number arranged within the MRW super-field according to a packing algorithm, the initial sequence number being within a transmitting window of the transmitter;

transmitting the MRW super-field to the receiver;

extracting the initial sequence number from the MRW super-field according to an extracting algorithm corresponding to the packing algorithm to enable identification of the initial sequence number;

assuming layer 2 PDU sequence numbers within MRW super-field are all sequentially on or after the initial sequence number when determining the sequential ordering of layer 2 PDUs for discarding each layer 2 SDU; and assuming the initial sequence number to be sequentially before an end point sequence number of the receiving window of the receiver.

12. A method according to claim 11 wherein a fixed bit length is used for the layer 2 PDU sequence numbers in the MRW super-field, and roll-over is capable of causing a first sequence number in the MRW super-field to have a lower value than a second sequence number in the MRW super-field, the first sequence number being sequentially after the second sequence number.

13. A method according to claim 11 wherein the MRW super-field further comprises a length field, the length field indicating the number of layer 2 PDU sequence numbers in the MRW super-field.

14. A method according to claim 13 wherein a special case value is used for the length field to indicate that the MRW super-field holds a single layer 2 PDU sequence number for a single layer 2 SDU that is to be discarded and that extends beyond the transmitting window of the transmitter, and the layer 2 PDU sequence number is assumed to be sequentially on or after a starting point sequence number of a receiving window of the receiver.

15. A method according to claim 11 wherein the packing algorithm places all layer 2 PDU sequence numbers in the MRW super-field into ascending sequential order.

16. A wireless communications system that uses a layer 2 protocol data unit (PDU) having a move receiving window (MRW) request to discard at least a layer 2 service data unit (SDU), the wireless communications system comprising:

a transmitter capable of transmitting a layer 2 MRW super-field comprising; a layer 2 PDU sequence number for each layer 2 SDU to be discarded, an initial sequence number arranged within the MRW super-field according to a packing algorithm, the initial sequence number being within a transmitting window of the transmitter; and a receiver capable of receiving the transmitted MRW super-field and extracting the initial sequence number from the MRW super-field according to an extracting algorithm that corresponds to the packing algorithm and that enables identification of the initial sequence number;

wherein the receiver assumes that the layer 2 PDU sequence numbers within MRW super-field are all sequentially on or after the initial sequence number when determining the sequential ordering of layer 2 PDUs for discarding each layer 2 SDU, and the receiver assumes the initial sequence number to be sequentially before an end point sequence number of the receiving window.

17. A wireless communications system according to claim 16 wherein a fixed bit length is used for the layer 2 PDU sequence number in the MRW super-field, and roll-over is capable of causing a first sequence number in the MRW super-field to have a lower value than a second sequence number in the MRW super-field, the first sequence number being sequentially after the second sequence number.

18. A wireless communications system according to claim 16 wherein the MRW super-field further comprises a length field, the length field indicating the number of layer 2 PDU sequence numbers in the MRW super-field.

19. A wireless communications system according to claim 18 wherein a special case value is used for the length field to indicate that the MRW super-field holds a single layer 2 PDU sequence number for a single layer 2 SDU that is to be discarded and that extends beyond the transmitting window of the transmitter, and the layer 2 PDU sequence number is assumed to be sequentially on or after a starting point sequence number of a receiving window of the receiver.

20. A wireless communications system according to claim 16 wherein the packing algorithm places all layer 2 PDU sequence numbers in the MRW super-field into ascending sequential order.

* * * * *